United States Patent
Bruner

(10) Patent No.: US 10,771,943 B1
(45) Date of Patent: Sep. 8, 2020

(54) PRIVACY-ENHANCED METHOD FOR LINKING AN ESIM PROFILE

(71) Applicant: Microsoft Technology Licensing, LLC, Redmond, WA (US)

(72) Inventor: John David Bruner, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/378,441

(22) Filed: Apr. 8, 2019

Related U.S. Application Data

(60) Provisional application No. 62/807,632, filed on Feb. 19, 2019.

(51) Int. Cl.
| | |
|---|---|
| H04W 4/50 | (2018.01) |
| H04W 76/11 | (2018.01) |
| H04W 12/06 | (2009.01) |
| H04L 9/06 | (2006.01) |
| H04W 12/00 | (2009.01) |
| H04W 8/24 | (2009.01) |

(52) U.S. Cl.
CPC .......... *H04W 4/50* (2018.02); *H04L 9/0643* (2013.01); *H04W 8/24* (2013.01); *H04W 12/00409* (2019.01); *H04W 12/06* (2013.01); *H04W 76/11* (2018.02)

(58) Field of Classification Search
CPC ........ H04W 4/50; H04W 76/11; H04W 8/24; H04W 12/06; H04W 12/00409; H04L 9/0643
See application file for complete search history.

(56) References Cited

U.S. PATENT DOCUMENTS

| | | | |
|---|---|---|---|
| 10,187,784 B1 * | 1/2019 | Chen | H04W 8/183 |
| 2007/0005963 A1 * | 1/2007 | Eldar | H04L 63/0876 |
| | | | 713/168 |

(Continued)

FOREIGN PATENT DOCUMENTS

WO 2018185435 A1 10/2018

OTHER PUBLICATIONS

"International Search Report and Written Opinion Issued in PCT Application No. PCT/US2020/017171", dated May 11, 2020, 32 Pages.

*Primary Examiner* — Tejis Daya
(74) *Attorney, Agent, or Firm* — Newport IP, LLC; Han Gim

(57) ABSTRACT

A temporary EID (TEID) is generated based on an indicator of a hash algorithm, a nonce, and a hash generated using the hash algorithm. The hash is generated based on the indicator, nonce, and EID of a mobile device. The TEID is sent to the mobile network operator to identify the mobile device in lieu of using the device's EID. The TEID is stored in a data store and an eSIM profile for the mobile device is associated the TEID. The mobile device sends to an eSIM server the device's EID over a secure communications channel. The eSIM server generates a hash using the indicator and nonce contained in the stored TEID and the EID of the mobile device. The eSIM server verifies that the generated hash matches the hash contained in the TEID stored in the data store. If the hash matches, the eSIM server sends, to the mobile device, subscription credentials for accessing the mobile network in accordance with the data plan.

20 Claims, 8 Drawing Sheets

(56) References Cited

U.S. PATENT DOCUMENTS

| | | |
|---|---|---|
| 2012/0136846 A1 | 5/2012 | Song et al. |
| 2014/0219447 A1 | 8/2014 | Park et al. |
| 2014/0287725 A1* | 9/2014 | Lee .................... H04L 63/0853 |
| | | 455/411 |
| 2016/0301529 A1* | 10/2016 | Park ..................... H04L 67/303 |
| 2018/0014178 A1 | 1/2018 | Baek et al. |
| 2018/0041601 A1* | 2/2018 | Park ......................... G06K 9/18 |
| 2018/0131699 A1* | 5/2018 | Park ..................... H04W 12/06 |
| 2020/0137566 A1* | 4/2020 | Jin .................... H04W 12/0609 |

\* cited by examiner

PRIVACY-ENHANCED METHOD FOR LINKING AN ESIM PROFILE

CROSS REFERENCE TO RELATED APPLICATION

This patent application claims the benefit of U.S. Patent Application Ser. No. 62/807,632 filed Feb. 19, 2019, entitled "PRIVACY-ENHANCED METHOD FOR LINKING AN ESIM PROFILE TO A PARTICULAR CARD SIM," which is hereby incorporated in its entirety by reference.

BACKGROUND

Service providers for communications devices generally require that the communications device have the proper credentials to access and enable use of services. The credentials securely and uniquely identify a subscription or account with the service provider and enable the communications device to access and use the services associated with the subscription. When the communications device is a mobile communications device, the service provider may be called a mobile network operator (MNO), and the services may include, for example, mobile voice calling, text messaging, or Internet data service.

The credentials may reside in a secure container called a Universal Integrated Circuit Card (UICC) or "SIM card." The UICC may support the remote provisioning of credentials, in which case it may be called an eUICC or an eSIM. The credentials may be provisioned to the eUICC/eSIM when manufactured or may be provisioned to the eUICC/eSIM remotely while the eUICC/eSIM resides in the communications device.

A mobile operator can request that an eSIM profile be associated with a specific eUICC card. Every eUICC card has a permanent unique identifier called the eUICC ID (EID). The EID may be shared with the mobile operator when ordering a new subscription and associated eSIM profile. The mobile operator can link the profile to the EID.

It is with respect to these considerations and others that the disclosure made herein is presented.

SUMMARY

The eSIM download procedure performs mutual authentication of the eUICC card and the download server. First, the eUICC card authenticates the download server. If this is successful, the download server authenticates the eUICC card. The EID is transmitted to the download server as part of this second step, but only after the download server is trusted. This is the only available protocol through which the EID is communicated to the download server.

The GSMA eSIM v3 specification includes an API on the device that can be used to obtain information about the device and eUICC card and to start a profile download. The intent is that an application on the device, e.g., acting on behalf of a mobile operator, can obtain the device information and send the device information to the operator, who creates a profile that can be downloaded. The information about the profile is then sent to the device, which downloads the profile. For privacy reasons, the EID is not communicated through this device API. Therefore, the operator does not know the EID of the eUICC card and cannot link the profile to that card. The profile can therefore potentially be downloaded to any card and not only the intended one, thereby exposing a security and privacy risk.

The GSMA eSIM v3 specification includes a mechanism that can be used to tie the API transaction on the device to the profile download. The operator server and device compute some shared session state that is used as part of the download procedure. The operator server can ensure that the entire transaction occurs in a single session: the API interaction followed by the download. However, the implementation is cumbersome, and if the download is incomplete (e.g., loss of connectivity during download) and needs to be retried, the entire API procedure must be repeated.

The disclosed embodiments describe technologies for securely allowing a profile to be downloaded to the correct eUICC card without exposing the EID of the eUICC card. In some embodiments, a hash is generated that is based upon the EID. The hash can be linked to a profile download order by an eSIM server and verified by that server, based upon knowledge of the underlying EID when the profile is downloaded.

In one embodiment, a temporary EID (TEID) may be generated using a secure hash algorithm, a nonce, and the EID. Upon request, the eUICC may generate a TEID value with a fresh nonce. This TEID value can be sent to a mobile operator through an application on the device that communicates with an operator server, e.g., as part of the GSMA eSIM local profile assistant (LPA) API. When the operator requests the preparation of an eSIM profile for download, it associates the TEID with the profile.

The profile download proceeds in the normal fashion up to the point where the download server identifies the profile to be downloaded. At this time, the download server has been authenticated by the eUICC and has received the EID from the eUICC. If the profile is linked to a TEID, the download server examines the first part of the TEID to determine the algorithm and nonce, computes the hash, and compares the hash to the stored TEID value. If they match, the EID is validated and the profile can be downloaded. If they do not match, then this may be an attempt to download the profile to another eUICC, and the download is rejected.

In a discovery scenario, the mobile network operator can prearrange for a profile to be available for the mobile device for download. The mobile device can communicate with a server to determine if a profile is available for the mobile device. The TEID may have previously been associated with a profile download order and used to identify the order. The server may search its records to match the TEIDs with the TEID for the mobile device. Once located, the described procedure herein can be used to verify the identity of the mobile device before providing the subscription profile.

The techniques disclosed herein can thus improve security and privacy when provisioning a mobile device, preventing the downloading of a subscription profile to any card and not the intended one. Furthermore, by providing a standardized method for more securely identifying a mobile device, the various systems can operate more efficiently by avoiding repeated and inefficient attempts to identify a device and download a profile, thus saving the use of memory, processing resources, network resources, etc. Other technical effects other than those mentioned herein can also be realized from implementations of the technologies disclosed herein.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION OF ILLUSTRATIVE EMBODIMENTS

Figure 1:
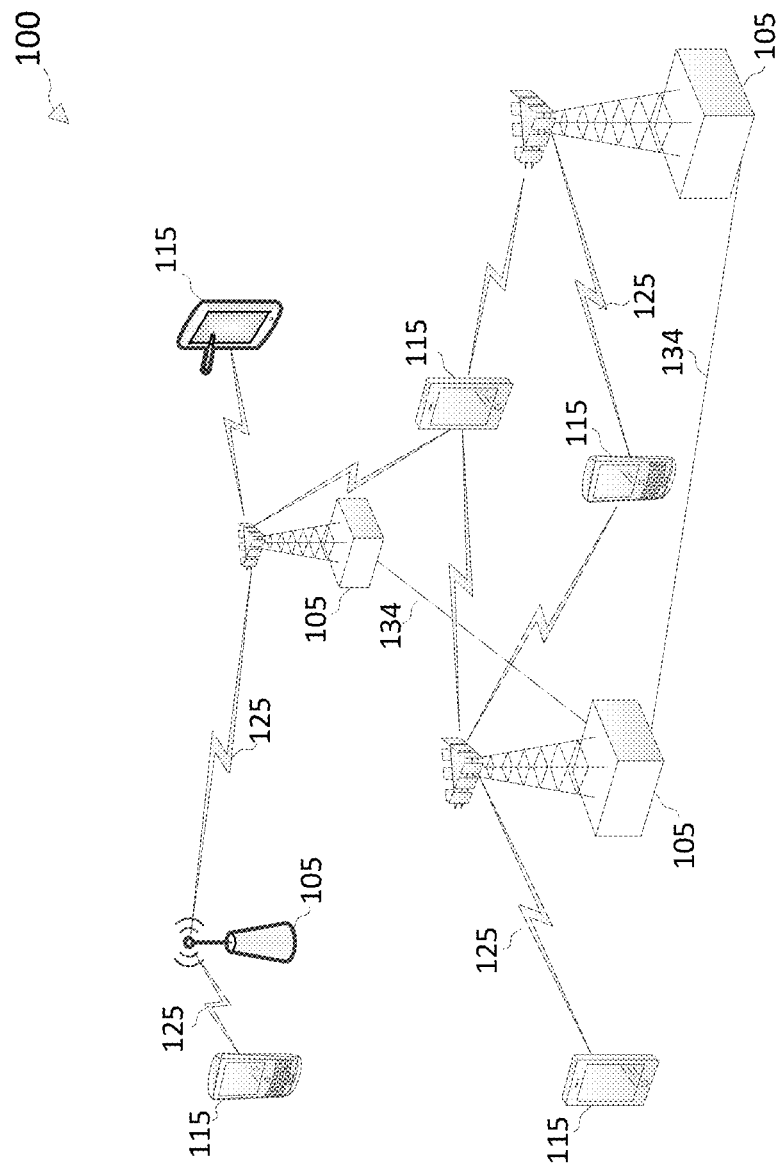
FIG. 1 depicts an example of a networked environment where aspects of the disclosure may be implemented.

A device that is capable of communicating on a mobile network but is not yet provisioned to do so typically obtains its provisioning information by obtaining information that describes the credentials to be provisioned, such as the activation code for an eSIM profile. The GSMA eSIM specification defines multiple ways for a device to determine this provisioning information. It may be provided from the operator to the user of the device, who then inputs it (e.g., scanning a QR code containing the information). Alternatively, the device may determine the provisioning information using a global discovery server (e.g., the SM-DS) which may also be referred to as a discovery server. The device finds the eSIM download server (e.g., the SM-DP+) it needs to contact in order to provision its eSIM, and to communicate with that server. The eSIM download server may also be referred to as the eSIM server or download server.

In both the current (v2) and in-progress (v3) GSMA eSIM specifications, a mobile operator can request that an eSIM profile be associated with a specific eUICC card. Every card has a permanent unique identifier called the eUICC ID (EID). The EID is disclosed to the end user through various means including the device interface. The end user may share the EID with the mobile operator when ordering a new subscription and associated eSIM profile. When the end user shares the EID with the mobile operator, the operator can link the profile to the EID.

The eSIM download procedure performs mutual authentication of the eUICC card and the download server. First, the card authenticates the download server. If this is successful, the download server authenticates the card. The EID is transmitted to the download server as part of this second step—only after the download server is trusted. This is the only protocol through which the EID is communicated to the download server.

The GSMA v3 eSIM specification includes an API on the device that can be used to obtain information about the device and eUICC card and to start a profile download. The intent is that an application on the device, e.g., acting on behalf of a mobile operator, gets the device information and sends it to the operator, who creates a profile to be downloaded. The information about the profile is then sent to the device, which downloads the profile. For privacy reasons, the EID is not communicated through this device API. Therefore, the operator does not know the EID of the eUICC card and cannot link the profile to that card. The profile can therefore be downloaded to any card (not only the intended one).

The GSMA eSIM v3 specification includes a mechanism that ties the API transaction on the device to the profile download. In this mechanism, the operator server and device compute some shared session state that is used as part of the download procedure. The server can ensure that the entire transaction occurs in a single session: the API interaction followed by the download. However, the implementation is cumbersome, and if the download is incomplete (e.g., loss of connectivity during download) and needed to be retried, the entire API procedure must be repeated.

The disclosure describes ways to use a hash based upon the EID that can be linked to a profile download order by an eSIM server and verified by that server, based upon knowledge of the underlying EID, when the profile is downloaded.

In an embodiment, a temporary EID (TEID) may be defined as follows:

TEID=alg||nonce||hash(alg||nonce||EID)

where "alg" is a value that identifies a secure hash algorithm (e.g., SHA256)

"nonce" is a random number (e.g., 128 bits)

"EID" is the eUICC ID

"||" represents concatenation

"hash" is the computation of the hash function identified by "alg"

Upon request, the eUICC may generate a TEID value with a fresh nonce. This value can be sent to a mobile operator through an application on the device that communicates with an operator server, e.g., as part of the GSMA eSIM LPA API.

When the operator requests the preparation of an eSIM profile for download, it can associate the TEID with the profile.

The profile download proceeds in the normal fashion up to the point where the download server identifies the profile to be downloaded. At this time, the download server has been authenticated by the eUICC and has received the EID from the eUICC. If the profile is linked to a TEID, the download server examines the first part of the TEID to determine the "alg" and "nonce", computes "hash(alg||nonce||EID)", and compares them to the stored TEID value. If they match, the EID is validated and the profile can be downloaded. If they do not match, then the download server may determine that this is an attempt to download the profile to another eUICC, and the download is rejected. It can be appreciated that hash algorithms other than SHA-256, such as SHA-512, SM3, and other algorithms.

In some embodiments, discovery of eSIM profiles may be implemented using the described TEID. In the discovery scenario, if the operator has the EID of the mobile device, the operator can prearrange for a profile to be available for download by the mobile device. Instead of an activation code that identifies the eSIM profile to be downloaded, the mobile device can communicate with a mobile server (SM-DP+) to determine if a profile is available for the mobile device. When the mobile device is turned on, the device can use available communications networks such as Wifi to contact the mobile operator server and obtain its profile. The mobile device may have previously been provided with information about the location of the mobile operator server, or the operator may place an event record in a discovery server (e.g., SM-DS) that identifies where to obtain the profile for this EID. The discovery server, based on the EID, may provide the record for the server that has the matching EID that represents the profile to be downloaded. The mobile device can then contact the identified server, provide its EID, and obtain the pre-arranged profile.

In an embodiment, the discovery scenario may implement the discovery scenario without disclosing the full EID and instead using the TEID. The TEID may be associated with the profile download order and used to identify the order. The mobile operator server or the discovery server may search its records to match the TEIDs with the TEID for the mobile device. Once located, the procedure described herein may be used to verify the identity of the mobile device before providing the subscription profile.

The techniques described herein may be implemented for devices in communication with various wireless communications systems such as CDMA, TDMA, FDMA, OFDMA, and SC-FDMA. A CDMA system may implement a radio technology such as CDMA2000, Universal Terrestrial Radio Access (UTRA), etc. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. The techniques described herein may be used for the systems and radio technologies mentioned above as well as other systems and radio technologies. The description below, however, describes a cellular system for purposes of example, although the techniques are applicable beyond cellular applications.

FIG. 1 is a block diagram conceptually illustrating an example of a wireless communications system 100, in accordance with an aspect of the present disclosure. The wireless communications system 100 includes base stations (or cells) 105 and mobile devices 115. The base stations 105 may communicate with the mobile devices 115 under the control of a base station controller (not shown), which may be part of a core network or the base stations 105. The wireless communications system 100 may support operation on multiple carriers. Multi-carrier transmitters can transmit modulated signals simultaneously on the multiple carriers. For example, each communication link 125 may be a multi-carrier signal modulated according to the various radio technologies described above.

The base stations 105 may wirelessly communicate with the mobile devices 115 via one or more base station antennas. The base stations 105 sites may provide communication coverage for respective coverage areas. The mobile devices 115 may be located throughout the wireless communications system 100 and may be stationary or mobile. A mobile device 115 may also be referred to as user equipment (UE), mobile station, a mobile unit, a subscriber unit, remote unit, a mobile device, a wireless communications device, a remote device, a mobile terminal, a wireless terminal, a handset, a mobile client, a client, or other suitable terminology. A mobile device 115 may be a cellular phone, a wireless modem, a wireless communication device, a handheld device, a tablet computer, a laptop computer, or the like. The communication links 125 shown in the wireless communications system 100 may include uplink (UL) transmissions from a mobile device 115 to a base station 105, and/or downlink (DL) transmissions, from a base station 105 to a mobile device 115.

Figure 2:
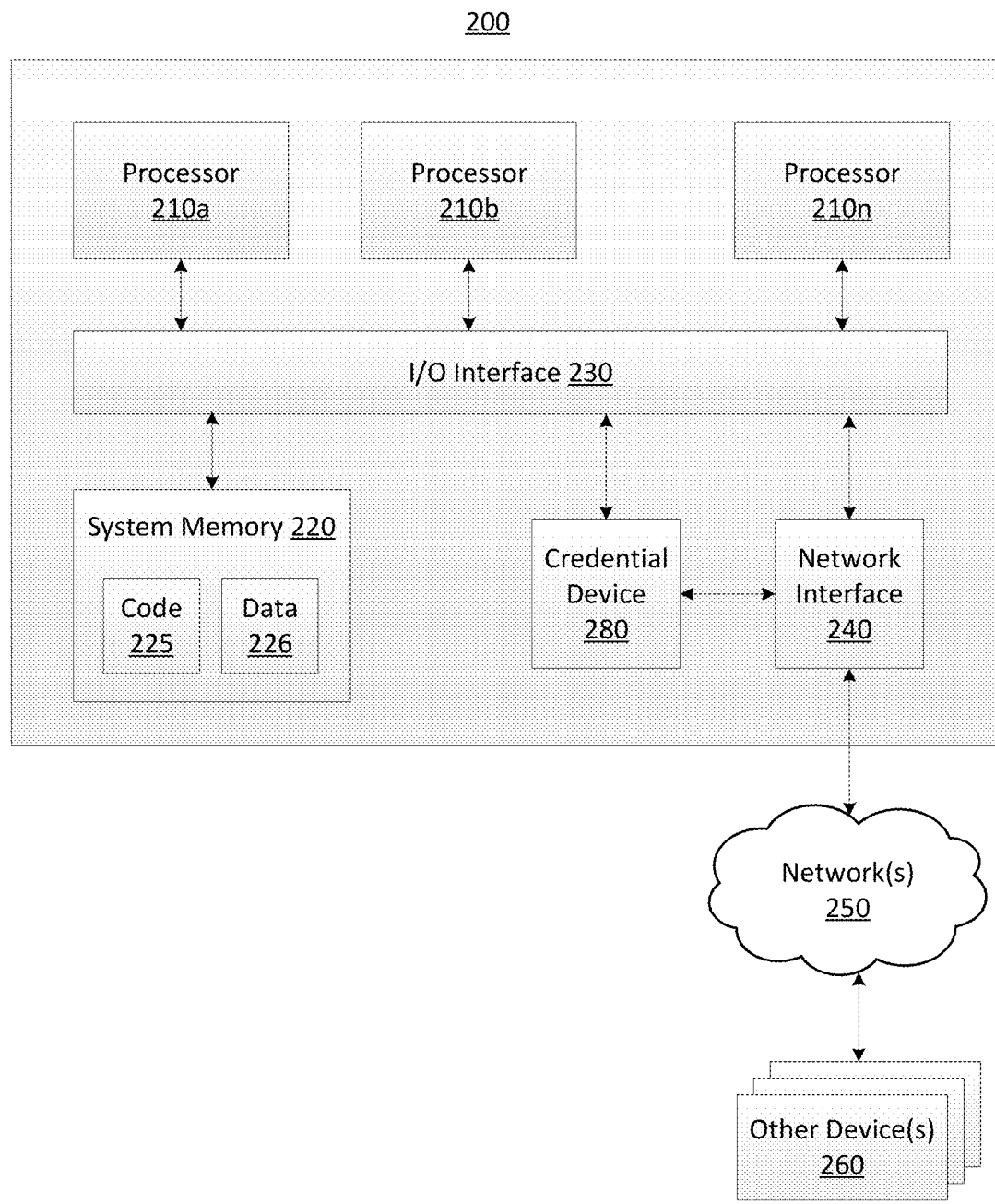
FIG. 2 depicts an example of a computing device where aspects of the disclosure may be implemented.

In at least some embodiments, a computing device that implements a portion or all of one or more of the technologies described herein may include a general-purpose computer system that includes or is configured to access one or more computer-accessible media. FIG. 2 illustrates such a general-purpose computing device 200. In the illustrated embodiment, computing device 200 includes one or more processors 210a, 210b, and/or 210n (which may be referred herein singularly as "a processor 210" or in the plural as "the processors 210") coupled to a system memory 220 via an input/output (I/O) interface 230. Computing device 200 further includes a network interface 240 coupled to I/O interface 230.

In various embodiments, computing device 200 may be a uniprocessor system including one processor 210 or a multiprocessor system including several processors 210 (e.g., two, four, eight, or another suitable number). Processors 210 may be any suitable processors capable of executing instructions. For example, in various embodiments, processors 210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 210 may commonly, but not necessarily, implement the same ISA.

System memory 220 may be configured to store instructions and data accessible by processor(s) 210. In various embodiments, system memory 220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 220 as code 225 and data 226.

In one embodiment, I/O interface 230 may be configured to coordinate I/O traffic between processor 210, system memory 220, and any peripheral devices in the device, including network interface 240 or other peripheral interfaces. In some embodiments, I/O interface 230 may perform any necessary protocol, timing, or other data transformations to convert data signals from one component (e.g., system memory 220) into a format suitable for use by another component (e.g., processor 210). In some embodiments, I/O interface 230 may include support for devices attached through various types of peripheral buses, such as a variant of the Peripheral Component Interconnect (PCI) bus standard or the Universal Serial Bus (USB) standard, for example. In some embodiments, the function of I/O interface 230 may be split into two or more separate components, such as a north bridge and a south bridge, for example. Also, in some embodiments some or all of the functionality of I/O interface 230, such as an interface to system memory 220, may be incorporated directly into processor 210.

Network interface 240 may be configured to allow data to be exchanged between computing device 200 and other device or devices 260 attached to a network or network(s) 250, such as other computer systems or devices as illustrated in FIGS. 1 through 7, for example. In various embodiments, network interface 240 may support communication via any suitable wired or wireless general data networks, such as types of Ethernet networks, for example. Additionally, network interface 240 may support communication via telecommunications/telephony networks such as analog voice networks or digital fiber communications networks, via storage area networks such as Fibre Channel SANs, cellular voice and/or data networks, or via any other suitable type of network and/or protocol. When a network interface 240 provides cellular communication its operation may be supported by a credential device 280 that may provide authentication, authorization, and other related information and services.

In some embodiments, system memory 220 may be one embodiment of a computer-accessible medium configured to store program instructions and data as described herein for FIGS. 1-7 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 200 via I/O interface 230. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 200 as system memory 220 or another type of memory. Portions or all of multiple computing devices, such as those illustrated in FIG. 2, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

Figure 3:
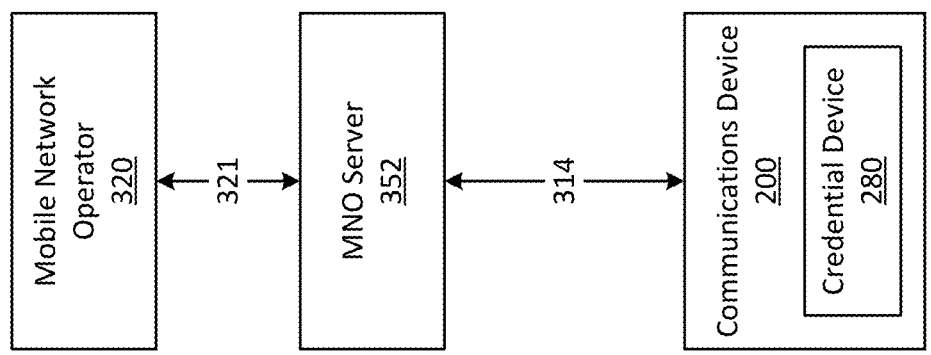
FIG. 3 depicts an example environment for provisioning of mobile devices.

The communications devices as used herein may refer to devices including, but not limited to, smartphones, cellular-enabled tablets and laptops, companion devices (e.g., smart watches), and non-consumer devices (telematics device in an automobile, cellular-connected utility meters, any of which may include some number of credential device(s) 280), and the like. With reference to FIG. 3, credential device 280 such as a UICC or eUICC may be included in the communications device 200 to ensure the integrity and security of personal data and enables communications with mobile communications providers. Such a communications device 200 may embody aspects of the computing device depicted in FIG. 2, and in some embodiments may incorporate one or more network interfaces 240 that communicates over a cellular network.

The 3rd Generation Partnership Project (3GPP) has defined specifications for communications devices covering technologies such as Global System for Mobile Communications (GSM), Universal Mobile Telecommunications System (UMTS), and Long-Term Evolution (LTE). The 3rd Generation Partnership Project 2 (3GPP2) has defined other specifications including Code Division Multiple Access (CDMA). For communications devices complying with these 3GPP or 3GPP2 specifications, their associated credentials are typically embedded in a SIM card. A SIM card may be a removable physical smart card conforming to UICC specification ETSI TS 102 221. The SIM card may be installed when the communications device is manufactured or at the point of sale. Alternatively, a SIM card may be purchased from the mobile operator for use with a communications device that is obtained separately and that has a physical slot conforming to the UICC specification.

Credentials for accessing a communications service provided by MNO 320 may include both data and instructions. When the instructions are executed on a processor, such as the processor of credential device 280 within a mobile communications device 200, the instructions may be configured to cause communication between the processor and a communications service server such that the communications service server may authenticate the credentials and enable the communications services. A set of credentials may be associated with a subscription for communications services from a particular communication service provider. Multiple sets of credentials may be provided for multiple subscriptions.

An eUICC may enable the service subscription used by the communications device to be securely reconfigured without physically adding or removing the eUICC from the communications device. An eUICC may hold one or multiple eUICC profiles, with one being typically active at one time. An eUICC profile, as used herein, generally refers to the client information associated with a network subscription, and embodiments are not limited to any particular eUICC system. A eUICC profile, may include a combination of file structure, data, and applications associated with the service credentials provisioned onto a credential device and which enable the communications device to use the subscription services associated with that profile.

For example, the GSM Association (GSMA) has defined an architecture for remote provisioning of a communications device for subscription services without physically swapping SIM cards for machine-to-machine scenarios by using a eUICC. Some automobile telematics systems are examples of systems that use eUICC devices.

FIG. 3 depicts one example environment for provisioning of profiles. A MNO 320 may own or otherwise control one or more MNO servers 352 through an interface 321. MNO servers may include an SM-DP+. A communications device, also known as User Equipment (UE) 200 may, for example, be a mobile communications device containing a credential device 280. The credential device 280 may refer to a physically removable device containing electronic credentials, such as a removable eUICC, or a non-removable device that can be electronically provisioned with subscription credentials, such as a soldered eUICC, or the like. The credential device 280 may also refer to a software container that can contain one or more e-profiles and that can be electronically provisioned with subscription credentials in accordance with some embodiments.

Once provisioned with credentials on a credential device 280, UE 200 may be configured to use the provisioned credentials to access MNO subscription services via network connection 314. Network connection 314 may also enable UE 200 to access enterprise services or resources. Network connection 314 may be any type of computer network connection, including wired, WiFi, a cellular data connection, and the like.

In some embodiments, the credential device 280 may be a removable or non-removable eUICC which may be provided by MNO 320 or other manufacturer.

Figure 4:
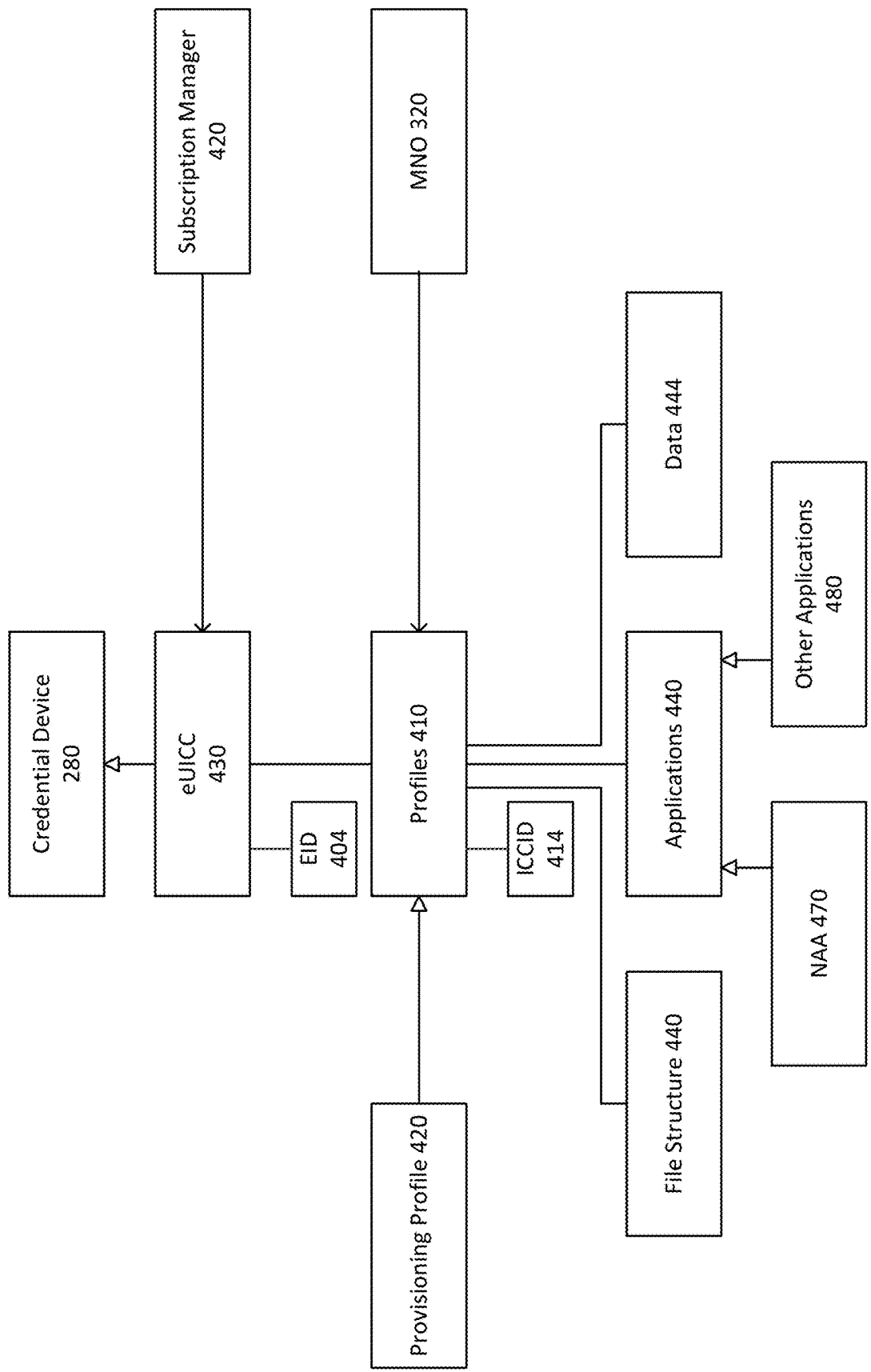
FIG. 4 depicts an example system for provisioning of mobile devices.

FIG. 4 depicts an example logical structure for a credential device 280 that may include a eUICC 430 containing profiles 410. Each profile may have a globally unique identifier referred to as ICCID 414. In some embodiments, eUICC 430 may be identified by a globally unique value referred to as the eUICC-ID or EID 404.

A credential device 280 may be implemented by an eUICC 430, which may be one embodiment of the credential device 280 of FIG. 3. A physical UICC may be another embodiment. As depicted in FIG. 4, the subscription manager 420 may communicate with the credential device 280 (such as eUICC 430).

At least one of the profiles 410 contained in the eUICC 430 may be used to provide connectivity to the subscription manager 420 for profile management. This profile may be designated as a provisioning profile 425.

In some scenarios, devices that are capable of communicating on a mobile network may connect and pay for mobile data plans directly with the mobile operator or with another entity that resells mobile operator services, such as a mobile virtual network operator (MVNO) or other reseller. The mobile operator may interact with the device and allow the user of the device to enroll for services from the operator. For example, a device may use an application that provides a mobile plan interface that allows a user to select a data plan for the device. The mobile operator may activate an account for the user and activate an eSIM profile that the device can download.

When doing so, in order to deliver an eSIM profile to the device's eUICC, the EID needs to be provided to the download server, as the mobile operator requires the profile to be downloaded to the specified card. However, the EID is a unique value which can uniquely identify a user, and thus the exposure of the EID, such as through a client-server interface, can be a privacy concern. It is thus desirable to restrict exposure of the EID by avoiding sending the EID as a clear text value over any channel that is not strongly authenticated.

In an embodiment, a cryptographic hash may be applied to the EID. The hash may be computed with a random number (nonce) that is concatenated with the EID. The random number and the hash value may then be transmitted instead of the actual EID. In some embodiments, the eUICC may generate a random number using a strong random number generator. The random number may be appended to the EID. In one embodiment, an indication of the hash algorithm may also be appended, such as SHA-256, SHA-512, or SM3. The hash may be applied to the entire concatenated value and transmitted along with the algorithm indication and the random number to the download server. The EID value itself is not sent, and thus is not exposed.

When the profile download is requested, a connection between the download server and the eUICC may be strongly authenticated, such as using a Transport Layer Security (TLS) channel. The eUICC may send the EID to the download server over the authenticated channel. In order to enable download of the correct profile to the eUICC, the activation code for the download request from the mobile operator can be linked to a particular EID. If the profile was pre-arranged by the mobile operator and the device has or can obtain the address of the download server, then the activation code may not be sent to the mobile device. By transmitting the hash value, transmission of the EID between the eUICC and the mobile operator and between the mobile operator and the download server can be avoided. In other words, the derived hash value may be associated with the profile download order instead of the actual EID.

During the profile download process, the eSIM server obtains the actual EID from the eUICC via the authenticated channel. The eSIM server now has information it needs to independently calculate the hash from the previously stored algorithm, random number, and now the EID. The eSIM server can compare the newly calculated hash value with the previously stored hash. If they match, then the download can proceed. If the profile was pre-arranged by the mobile operator, the eSIM server may search its records to match the TEIDs with the TEID for the mobile device. Once located, the procedure described herein may be used to verify the identity of the mobile device before providing the subscription profile.

Figure 5A:
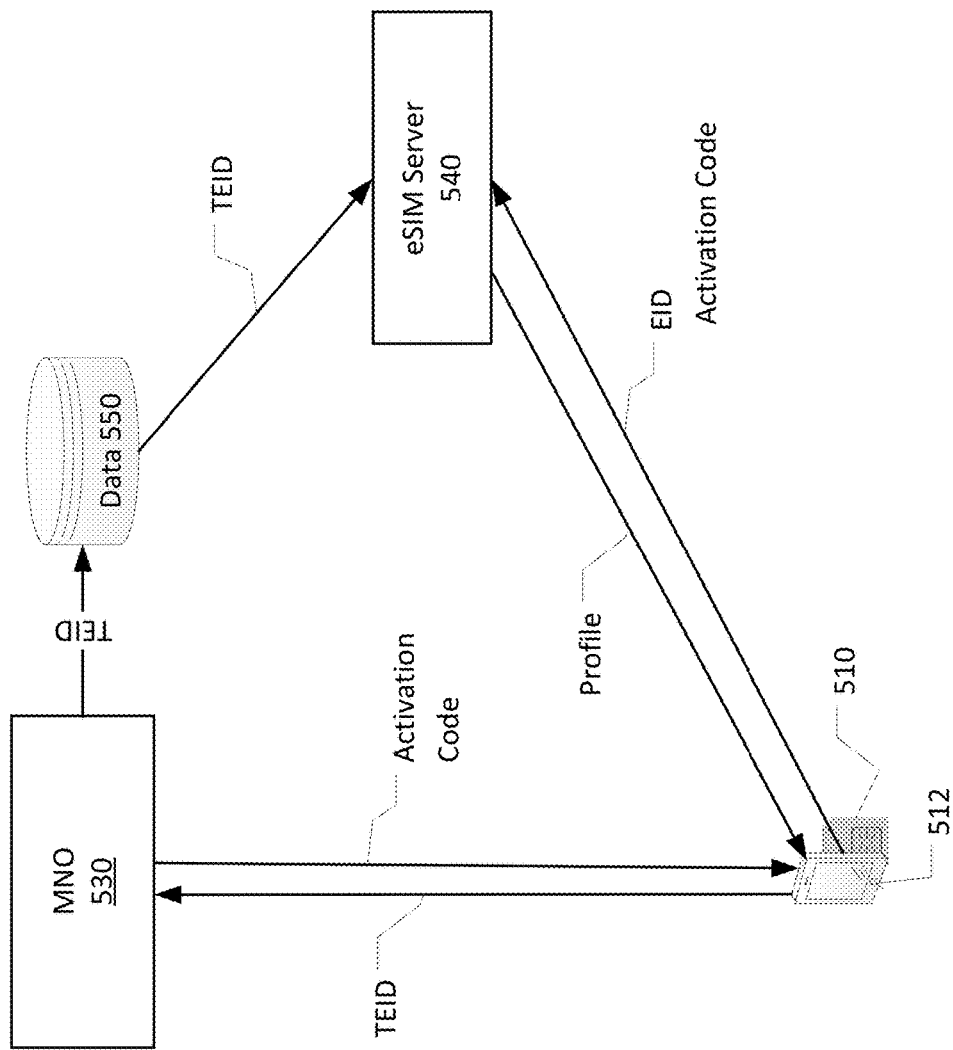
FIG. 5A depicts an example system for provisioning of mobile devices.

Referring to FIG. 5A, according to an embodiment of the present disclosure, mobile device 512 with eUICC 510 may calculate and send a TEID to MNO 530. MNO 530 may store the TEID in a datastore 550. The datastore 550 may include TEID information for various mobile devices. MNO 530 may provide an activation code to eUICC 510. The activation code may include subscription information (e.g., server address and associated token). eUICC 510 may send its EID and the received activation code to the eSIM server 540. eSIM server 540 may access the datastore 550 to obtain the stored TEID previously sent to MNO 530 and stored in datastore 550. eSIM server 540 may obtain the first part of the received TEID to determine the algorithm and nonce and compute the hash of the algorithm indication, nonce, and EID. The eSIM server 540 may then compare the calculated value with the stored TEID value. If they match, the EID is validated and the profile can be downloaded to the eUICC 510. If they do not match, then the download may be rejected.

Figure 5B:
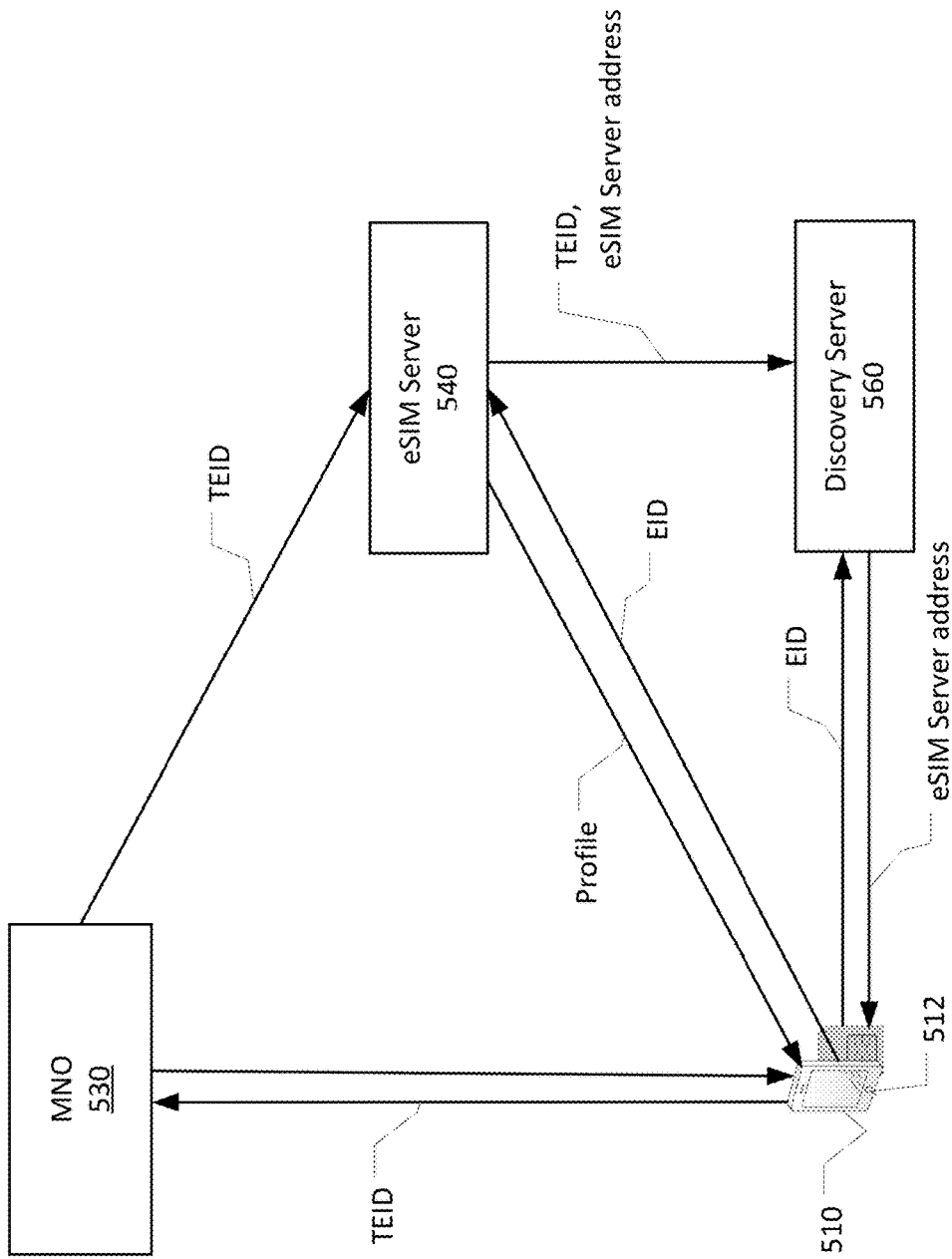
FIG. 5B depicts an example system for provisioning of mobile devices.

Referring to FIG. 5B, illustrated is another embodiment of the present disclosure in a discovery scenario. Mobile device 512 with eUICC 510 may calculate and send a TEID to MNO 530. MNO 530 may provide the TEID to the eSIM server 540. The eSIM server 540 may have access to TEID information for a plurality of mobile devices. Mobile device 512 may have previously been provisioned with a server address for the eSIM server 540. Alternatively, the eSIM server 540 may send the TEID and eSIM server information to the discovery server 560. eUICC 510 may send its EID to the discovery server 560 to obtain the address for the eSIM server 540. eUICC 510 may send its EID to the eSIM server 540. eSIM server 540 may access previously stored TEID information, obtain the first part of the received TEID to determine the algorithm and nonce, and compute the hash of the algorithm indication, nonce, and EID. The eSIM server 540 may also compute the hash for the previously stored TEID(s). The eSIM server 540 may then compare the calculated values with the stored TEID value(s) to determine if there is a match. If a matching record is found, the EID is validated and the matching profile can be downloaded to the eUICC 510. If none of the records match, then the download may be rejected.

Figure 6:
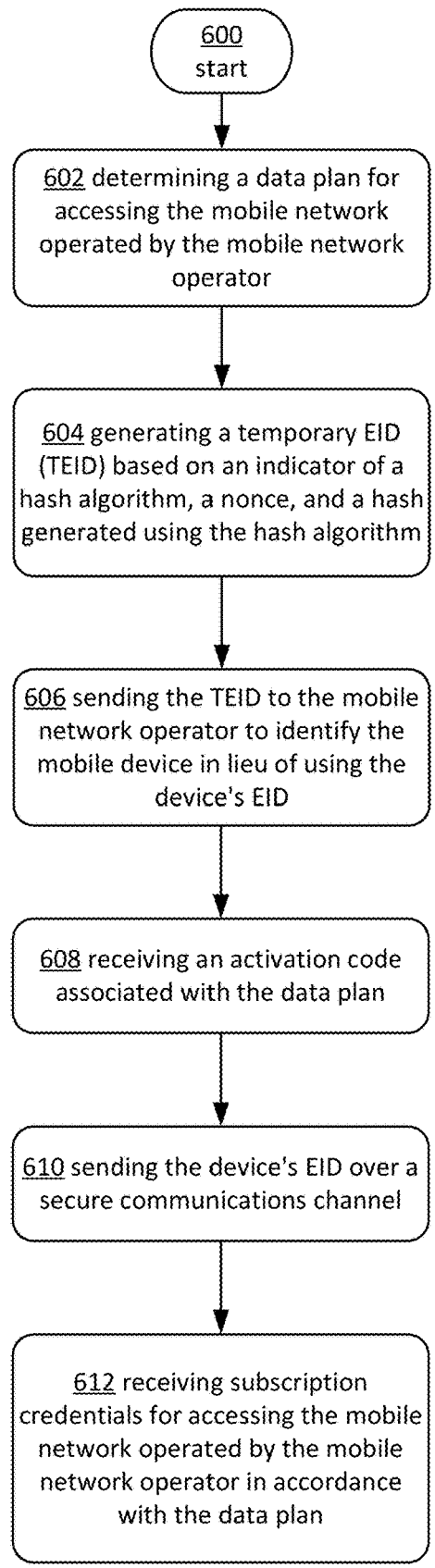
FIG. 6 depicts an operational procedure for provisioning of mobile devices.

FIG. 6 illustrates an example operational procedure for one embodiment of provisioning a mobile device in accordance with this disclosure. In an embodiment, the operational procedure may be implemented in a computing device. The computing device may have a memory that has stored thereon computer-executable instructions that, when executed, cause the computing device to perform operations as described.

Referring to FIG. 6, operation 600 begins the operational procedure. Operation 600 may be followed by operation 602. Operation 602 illustrates determining, by the mobile device in communication with a mobile network operator, a data plan for accessing the mobile communications network operated by the mobile network operator.

Operation 602 may be followed by operation 604. Operation 604 illustrates generating, by the mobile device, a temporary EID (TEID) based on an indicator of a hash algorithm, a nonce, and a hash generated using the hash algorithm. In an embodiment, the hash is generated based on the indicator, nonce, and EID of the mobile device.

Operation 604 may be followed by operation 606. Operation 606 illustrates sending, by the mobile device, the TEID to the mobile network operator to identify the mobile device in lieu of using the device's EID. In an embodiment, the TEID is stored in a data store and an eSIM profile for the mobile device is associated the TEID.

Operation 606 may be followed by operation 608. Operation 608 illustrates receiving, by the mobile device from the mobile network operator, an activation code associated with the data plan.

Operation 608 may be followed by operation 610. Operation 610 illustrates sending, by the mobile device to an eSIM server indicated by the activation code, the device's EID over a secure communications channel.

Operation 610 may be followed by operation 612. Operation 612 illustrates receiving, by the mobile device via the secure communications channel, subscription credentials for accessing the mobile communications network operated by the mobile network operator in accordance with the data plan. In an embodiment, the subscription credentials are provided based in part on a verification of the hash contained in the TEID stored in the data store to a hash generated using the indicator and nonce contained in the stored TEID and the device's EID received over the secure communications channel.

Figure 7:
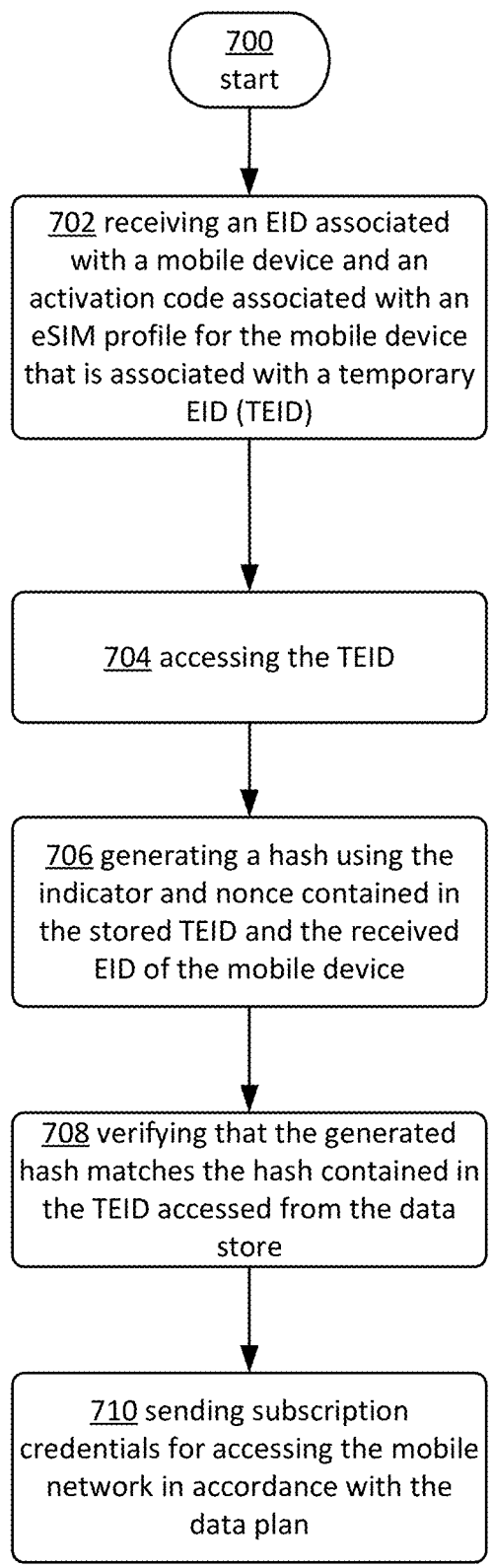
FIG. 7 depicts an operational procedure for provisioning of mobile devices.

FIG. 7 illustrates an example operational procedure for one embodiment of provisioning a mobile device in accordance with this disclosure. In an embodiment, the operational procedure may be implemented in a computing device. The computing device may have a memory that has stored thereon computer-executable instructions that, when executed, cause the computing device to perform operations as described.

Referring to FIG. 7, operation 700 begins the operational procedure. Operation 700 may be followed by operation 702. Operation 702 illustrates receiving an EID associated with a mobile device and an activation code associated with an eSIM profile for the mobile device that is associated with a temporary EID (TEID). In an embodiment, the eSIM profile is associated with a data plan for the mobile device for accessing a mobile network operated by a mobile network operator.

Operation 702 may be followed by operation 704. Operation 704 illustrates accessing, from a data store, the TEID. In an embodiment, the TEID is generated based on an indicator of a hash algorithm, a nonce, and a hash generated using the hash algorithm. In an embodiment, the hash is generated based on the indicator, nonce, and an EID of the mobile device.

Operation 704 may be followed by operation 706. Operation 706 illustrates generating a hash using the indicator and nonce contained in the stored TEID and the received EID of the mobile device.

Operation 706 may be followed by operation 708. Operation 708 illustrates verifying that the generated hash matches the hash contained in the TEID accessed from the data store.

Operation 708 may be followed by operation 710. Operation 710 illustrates based on the verifying, sending, to the mobile device, subscription credentials for accessing the mobile network in accordance with the data plan.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein encompasses the subject matter set forth in the following example clauses.

Example Clause A, a method of provisioning a mobile device configured to communicate on a mobile communications network operated by a mobile network operator, the method comprising:

determining, by the mobile device in communication with the mobile network operator, a data plan for accessing the mobile communications network operated by the mobile network operator;

generating, by the mobile device, a temporary EID (TEID) based on an indicator of a hash algorithm, a nonce, and a hash generated using the hash algorithm, wherein the hash is generated based on the indicator, nonce, and EID of the mobile device;

sending, by the mobile device to the mobile network operator, the TEID to identify the mobile device in lieu of using the device's EID, wherein the TEID is stored in a data store and an eSIM profile for the mobile device is associated the TEID;

receiving, by the mobile device from the mobile network operator, an activation code associated with the data plan;

sending, by the mobile device to an eSIM server indicated by the activation code, the device's EID over a secure communications channel; and receiving, by the mobile device via the secure communications channel, subscription credentials for accessing the mobile communications network operated by the mobile network operator in accordance with the data plan, the subscription credentials provided based in part on a verification of the hash contained in the TEID stored in the data store to a hash generated using the indicator and nonce contained in the stored TEID and the device's EID received over the secure communications channel.

Example Clause B, the method of Example Clause A, wherein the eSIM server is an SM-DP+ server, the location of which is included in the activation code.

Example Clause C, the method of any one of Example Clauses A through B, wherein the activation code identifies a SIM profile to be obtained from the mobile network operator.

Example Clause D, the method of any one of Example Clauses A through C, wherein the TEID is a concatenation of the hash algorithm indicator, nonce, and the generated hash.

Example Clause E, the method of any one of Example Clauses A through D, wherein the verification comprises generating a hash using the hash algorithm using the indicator, nonce, and the received EID.

Example Clause F, the method of any one of Example Clauses A through E, wherein the hash algorithm is one of SHA-256, SHA-512, or SM3.

While Example Clauses A through F are described above with respect to a method, it is understood in the context of this disclosure that the subject matter of Example Clauses A through F can additionally or alternatively be implemented by a system, computer readable media, or device.

Example Clause G, a computing device comprising:

a memory storing thereon instructions that when executed by a processor of the computing device, cause the computing device to perform operations comprising:

receiving an EID associated with a mobile device and an activation code associated with an eSIM profile for the mobile device that is associated with a temporary EID (TEID), wherein the eSIM profile is associated with a data plan for the mobile device for accessing a mobile network operated by a mobile network operator;

accessing, from a data store, the TEID, wherein the TEID is generated based on an indicator of a hash algorithm, a nonce, and a hash generated using the hash algorithm, and wherein the hash is generated based on the indicator, nonce, and an EID of the mobile device;

generating a hash using the indicator and nonce contained in the stored TEID and the received EID of the mobile device;

verifying that the generated hash matches the hash contained in the TEID accessed from the data store; and based on the verifying, sending, to the mobile device, subscription credentials for accessing the mobile network in accordance with the data plan.

Example Clause H, the computing device of Example Clause G, wherein the computing device is an SM-DP+ server, the location of which is included in the activation code.

Example Clause I, the computing device of any one of Example Clauses G through H, wherein the activation code identifies the subscription credentials to be sent to the mobile device.

Example Clause J, the computing device of any one of Example Clauses G through I, wherein the TEID is a concatenation of the hash algorithm indicator, nonce, and the generated hash.

Example Clause K, the computing device of any one of Example Clauses G through J, wherein the hash algorithm is one of SHA-256, SHA-512, or SM3.

While Example Clauses G through K are described above with respect to a computing device, it is understood in the context of this disclosure that the subject matter of Example Clauses G through K can additionally or alternatively be implemented by a system, method, or computer readable media.

Example Clause L, a method of provisioning a mobile device configured to communicate on a mobile communications network operated by a mobile network operator, the method comprising:

determining, by the mobile device in communication with the mobile network operator, a data plan for accessing the mobile communications network operated by the mobile network operator;

generating, by the mobile device, a temporary EID (TEID) based on an indicator of a hash algorithm, a nonce, and a hash generated using the hash algorithm, wherein the hash is generated based on the indicator, nonce, and EID of the mobile device;

sending, by the mobile device to the mobile network operator, the TEID to identify the mobile device in lieu of using the device's EID, wherein the TEID is stored in a data store and an eSIM profile for the mobile device is associated the TEID;

sending, by the mobile device to an eSIM server, the device's EID over a secure communications channel; and receiving, by the mobile device via the secure communications channel, subscription credentials for accessing the mobile communications network operated by the mobile network operator in accordance with the data plan, the subscription credentials provided based in part on:

a verification of the hash contained in the TEID stored in the data store to a hash generated using the indicator and nonce contained in the stored TEID and the device's EID received over the secure communications channel.

Example Clause M, the method of Example Clause L, wherein the subscription credentials are further provided based in part on:

based on the TEID, determining that delivery of the subscription credentials for the mobile device is pending.

Example Clause N, the method of any of Example Clauses L through M, wherein determining that delivery of the subscription credentials for the mobile device is pending comprises:

matching the TEID with stored TEIDs that are associated with pending subscription credentials.

Example Clause O, the method of any one of Example Clauses L through N, wherein the eSIM server is an SM-DP+ server.

Example Clause P, the method of any one of Example Clauses L through O, wherein a location of the eSIM server is provided by a discovery server.

Example Clause Q, the method of any one of Example Clauses L through P, wherein the TEID is a concatenation of the hash algorithm indicator, nonce, and the generated hash.

Example Clause R, the method of any one of Example Clauses L through Q, wherein the verification comprises generating a hash using the hash algorithm using the indicator, nonce, and the received EID.

Example Clause S, the method of any one of Example Clauses L through R, wherein the hash algorithm is one of SHA-256, SHA-512, or SM3.

Example Clause T, the method of any one of Example Clauses L through S, wherein the subscription credentials are pre-arranged to be available for the mobile device.

While Example Clauses L through T are described above with respect to a method, it is understood in the context of this disclosure that the subject matter of Example Clauses L through T can additionally or alternatively be implemented by a system, computer readable media, or via a device.

What is claimed is:

1. A method of provisioning a mobile device configured to communicate on a mobile communications network operated by a mobile network operator, the method comprising:

determining, by the mobile device in communication with the mobile network operator, a data plan for accessing the mobile communications network operated by the mobile network operator;

generating, by the mobile device, a temporary EID (TEID) based on an indicator of a hash algorithm, a nonce, and a hash generated using the hash algorithm, wherein the hash is generated based on the indicator, nonce, and EID of the mobile device;

sending, by the mobile device to the mobile network operator, the TEID to identify the mobile device in lieu of using the device's EID, wherein the TEID is stored in a data store and an eSIM profile for the mobile device is associated the TEID;

receiving, by the mobile device from the mobile network operator, an activation code associated with the data plan;

sending, by the mobile device to an eSIM server indicated by the activation code, the device's EID over a secure communications channel; and receiving, by the mobile device via the secure communications channel, subscription credentials for accessing the mobile communications network operated by the mobile network operator in accordance with the data plan, the subscription credentials provided based in part on a verification of the hash contained in the TEID stored in the data store to a hash generated using the indicator and nonce contained in the stored TEID and the device's EID received over the secure communications channel.

2. The method of claim 1, wherein the eSIM server is an SM-DP+ server, the location of which is included in the activation code.

3. The method of claim 1, wherein the activation code identifies a SIM profile to be obtained from the mobile network operator.

4. The method of claim 1, wherein the TEID is a concatenation of the hash algorithm indicator, nonce, and the generated hash.

5. The method of claim 1, wherein the verification comprises generating a hash using the hash algorithm using the indicator, nonce, and the received EID.

6. The method of claim 1, wherein the hash algorithm is one of SHA-256, SHA-512, or SM3.

7. A computing device comprising:

a memory storing thereon instructions that when executed by a processor of the computing device, cause the computing device to perform operations comprising:

receiving an EID associated with a mobile device and an activation code associated with an eSIM profile for the mobile device that is associated with a temporary EID (TEID), wherein the eSIM profile is associated with a data plan for the mobile device for accessing a mobile network operated by a mobile network operator;

accessing, from a data store, the TEID, wherein the TEID is generated based on an indicator of a hash algorithm, a nonce, and a hash generated using the hash algorithm, and wherein the hash is generated based on the indicator, nonce, and an EID of the mobile device;

generating a hash using the indicator and nonce contained in the stored TEID and the received EID of the mobile device;

verifying that the generated hash matches the hash contained in the TEID accessed from the data store; and based on the verifying, sending, to the mobile device, subscription credentials for accessing the mobile network in accordance with the data plan.

8. The computing device of claim 7, wherein the computing device is an SM-DP+ server, the location of which is included in the activation code.

9. The computing device of claim 7, wherein the activation code identifies the subscription credentials to be sent to the mobile device.

10. The computing device of claim 7, wherein the TEID is a concatenation of the hash algorithm indicator, nonce, and the generated hash.

11. The computing device of claim 7, wherein the hash algorithm is one of SHA-256, SHA-512, or SM3.

12. A method of provisioning a mobile device configured to communicate on a mobile communications network operated by a mobile network operator, the method comprising:
   determining, by the mobile device in communication with the mobile network operator, a data plan for accessing the mobile communications network operated by the mobile network operator;
   generating, by the mobile device, a temporary EID (TEID) based on an indicator of a hash algorithm, a nonce, and a hash generated using the hash algorithm, wherein the hash is generated based on the indicator, nonce, and EID of the mobile device;
   sending, by the mobile device to the mobile network operator, the TEID to identify the mobile device in lieu of using the device's EID, wherein the TEID is stored in a data store and an eSIM profile for the mobile device is associated the TEID;
   sending, by the mobile device to an eSIM server, the device's EID over a secure communications channel; and
   receiving, by the mobile device via the secure communications channel, subscription credentials for accessing the mobile communications network operated by the mobile network operator in accordance with the data plan, the subscription credentials provided based in part on:
      a verification of the hash contained in the TEID stored in the data store to a hash generated using the indicator and nonce contained in the stored TEID and the device's EID received over the secure communications channel.

13. The method of claim 12, wherein the subscription credentials are further provided based in part on:
   based on the TEID, determining that delivery of the subscription credentials for the mobile device is pending.

14. The method of claim 13, wherein determining that delivery of the subscription credentials for the mobile device is pending comprises:
   matching the TEID with stored TEIDs that are associated with pending subscription credentials.

15. The method of claim 12, wherein the eSIM server is an SM-DP+ server.

16. The method of claim 12, wherein a location of the eSIM server is provided by a discovery server.

17. The method of claim 12, wherein the TEID is a concatenation of the hash algorithm indicator, nonce, and the generated hash.

18. The method of claim 12, wherein the verification comprises generating a hash using the hash algorithm using the indicator, nonce, and the received EID.

19. The method of claim 12, wherein the hash algorithm is one of SHA-256, SHA-512, or SM3.

20. The method of claim 12, wherein the subscription credentials are pre-arranged to be available for the mobile device.

* * * * *